July 9, 1963 T. H. BONN 3,097,307

OPPOSITE CONDUCTING TYPE TRANSISTOR CONTROL CIRCUITS

Filed July 6, 1955 3 Sheets-Sheet 1

INVENTOR.
THEODORE H. BONN
BY
Charles C. English
AGENT

OPPOSITE CONDUCTING TYPE TRANSISTOR CONTROL CIRCUITS

Filed July 6, 1955 3 Sheets-Sheet 2

INVENTOR.
THEODORE H. BONN
BY
Charles E. English
AGENT

INVENTOR.
THEODORE H. BONN
BY
Charles C. English
AGENT

United States Patent Office 3,097,307
Patented July 9, 1963

3,097,307

OPPOSITE CONDUCTING TYPE TRANSISTOR CONTROL CIRCUITS

Theodore H. Bonn, Philadelphia, Pa., assignor to Sperry Rand Corporation, a corporation of Delaware Filed July 6, 1955, Ser. No. 520,266
14 Claims. (Cl. 307—88.5)

The present invention relates to transistor control circuits in the nature of switches, and is more particularly concerned with switching devices utilizing transistors interposed between a load and a source of energization for selectively coupling energy to a selected load or loads. In a preferred form of the present invention, such switching or control circuits may include transistor switches operating at both ends of a load whereby a simultaneity of signals is required to effect current flow through the load. In this respect, therefore, certain aspects of the present invention may be considered to operate as gating devices.

It is often desired to selectively couple either current or voltage sources to a load in response to the presence of one or more signal inputs. In accordance with the present invention, switching circuits capable of performing this function utilize transistors whereby the power gain of such transistors may be directly employed in switching applications, thereby to effect more efficient switching arrangements than has been the case heretofore, and to allow switching to occur at relatively low levels of energy.

The circuits to be described are merely illustrative and the concepts of the present invention may in fact be applied to rather complex switching networks for use in general switching applications, in gating devices and in various apparatuses, such as those concerned with magnetic recording or memory systems. The concepts of the present invention include the provision of transistor devices interposed between a load and a source of energization, and these transistor devices may in fact be coupled to both ends of the load, and may comprise either a single or plural transistors so coupled at each end. The transistors may further be coupled, either in series between a given end of a load and a source of energization whereby plural input signals rendering each of the series connected transistors conductive, may be required to effect current flow to the load; and/or the transistors may be coupled in parallel between a given end of the load and a source of energization whereby signal inputs may selectively effect bidirectional current flows through the load.

It is accordingly an object of the present invention to provide improved switching circuits.

A further object of the present invention resides in the provision of switching circuits which may be utilized in memory systems, in gating devices, and in general switching applications.

Still another object of the present invention resides in the provision of switching circuits employing transistors.

A further object of the present invention resides in the provision of switching circuits which are more efficient than has been the case heretofore, and which allow switching to occur at relatively low energy levels.

Still another object of the present invention resides in the provision of switching circuits selectively switching both ends of a load thereby to control energy flow to the load.

Still another object of the present invention resides in the provision of switching circuits having better operating characteristics than has been the case heretofore.

The foregoing objects, advantages, construction and operation of the present invention will become more readily apparent from the following description and accompanying drawings, in which:

FIGURES 1A and 1B are schematic diagrams of simplified switching circuits constructed in accordance with the present invention.

Figure 1B:
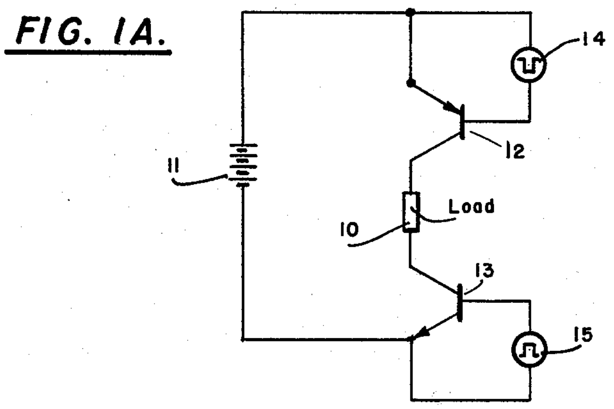

Referring now to FIGURE 1A, it will be seen that, in accordance with one embodiment of the present invention, a load 10 may be selectively coupled to a source of energization 11, by means selectively switching both ends of the load 10. In the particular embodiment shown in FIGURE 1A, the switching means may comprise a first transistor 12 coupled between the upper end of load 10 and one terminal of the source 11, and a further transistor 13 coupled between the lower end of load 10 and the other terminal of the source 11. The states of conductivity of the transistors 12 and 13 are selectively controlled by signal sources 14 and 15 coupled to the transistors 12 and 13, as shown. In the absence of appropriate signals from sources 14 and 15, the transistors 12 and 13 present a high impedance whereby current from source 11 is prevented from flowing to load 10. The application of signals from source 14 may be utilized to switch transistor 12 to a low impedance state; and similarly, signals from source 15 may selectively switch transistor 13 to a low impedance state. Thus, in accordance with the embodiment of the invention shown in FIGURE 1A, the simultaneity of appropriate signals from each of signal sources 14 and 15 will cause each of transistors 12 and 13 to assume a low impedance state whereby current may readily flow from energization source 11, through transistor 12, and thence through load 10 and transistor 13.

It will be noted that in the particular arrangement of FIGURE 1A, the transistors 12 and 13 are complementary in nature. Thus, transistor 12 is a PNP transistor, while transistor 13 is an NPN transistor; and this particular arrangement of transistors switching each end of load 10 is preferred, although it is not mandatory. It will be appreciated that when complementary transistors of the types shown in FIGURE 1A are employed, the circuit enables one to reference the transistor base to the same D.C. source to which the emitter is coupled, whereby large voltage swings coupled to the control electrode of the transistor may be avoided. An example of the use of non-complementary transistors will be discussed subsequently in reference to FIGURE 3. It will also be appreciated that in the particular arrangement of FIGURE 1A, a grounded emitter circuit is employed for each of transistors 12 and 13. This particular configuration may be preferred in order to realize the current gain obtainable from such a connection; but, it will be obvious to those skilled in the art, that any of the other recognized transistor connections may be employed in effecting the principles of the present invention.

For example, FIGURE 1B illustrates a circuit in which the control signal is applied between base and emitter while the base is connected to the source of energy. The various components of the circuit shown in FIGURE 1B have been appropriately labelled.

Returning now to FIGURE 1A, it will be seen that in order to switch transistor 12 to a low impedance state, the signal source 14 should provide a negative-going signal whereby the base of the transistor 12 is switched negative with respect to the emitter thereof. In the case of transistor 13, however, the signal source 15 should apply a positive-going signal whereby the base is switched positive with respect to its emitter. When the proper negative and positive-going signals occur simultaneously from sources 14 and 15 respectively, the source of energization 11 will be effectively coupled to load 10, as described previously.

While the arrangements of FIGURES 1A and 1B have utilized a single transistor interposed between each end of a load and a source of energization, it will be appreciated that such a single transistor may in fact be replaced by a plurality of transistors, whereby switching is effected in response to a simultaneity or coincidence of signals greater in number than two. Thus, referring to FIGURE 2, it will be seen that a load 20 may be selectively coupled to a source of energization 21 by a first pair of transistors 22 and 23, coupled between one end of load 20 and one terminal of source 21, and by a further pair of transistors 24 and 25 coupled between the other end of the load 20 and the other terminal of source 21. The states of conductivity of transistors 22 through 25 inclusive may be selectively controlled by signal sources 26, 27, 28 and 29 respectively. The use of such plural transistors interposed between each end of the load 20 and the source 21 becomes entirely feasible inasmuch as each of the transistors effects a relatively low drop when it is in a conductive state; and in view of the low loss across each of the transistors, as compared with the supply voltage of energization source 21, high power efficiencies are still obtainable even when a relatively large number of transistors are placed in series.

Figure 2:
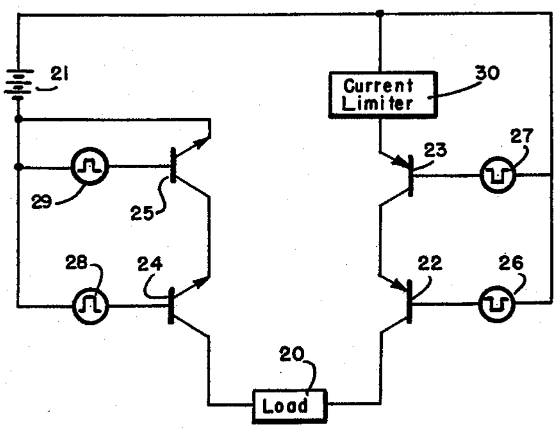
FIGURE 2 is a modified form of the present invention utilizing plural transistors switching each end of the load.

In the arrangement of FIGURE 2, the transistors 22 and 23 are PNP transistors, while transistors 24 and 25 are NPN transistors, whereby the transistors coupled to opposing ends of the load are once more complementary in nature. In response to the simultaneous occurrence of appropriate signals from signal sources 26 through 29 inclusive, each of transistors 22 through 25 will be switched to a low impedance state whereby energization source 21 is effectively coupled across load 22 thereby to effect a desired current flow therethrough.

In many circuits it is desirable to feed a constant current to the load, such as 20, although transistors such as 22 through 25 ordinarily operate most efficiently when fed from constant voltage sources. When such a consideration is present, therefore, a current limiter such as 30 may be included in the circuit, and this current limiter may take any of the forms known in the art.

As has been discussed previously, it is ordinarily desirable to utilize complementary transistors when switching both ends of the load, in accordance with the present invention. However, this consideration is not mandatory and non-complementary transistors may in fact be employed. Thus, referring to FIGURE 3, it will be seen that a load 31 may be selectively coupled to a source of energization 32 by a pair of transistors 33 and 34 interposed between opposing ends of load 13 and the source of energization 32, as shown. In the particular arrangement of FIGURE 3, the transistors 33 and 34 are non-complementary in nature and each comprises, for instance, a PNP type of transistor.

Figure 1B:
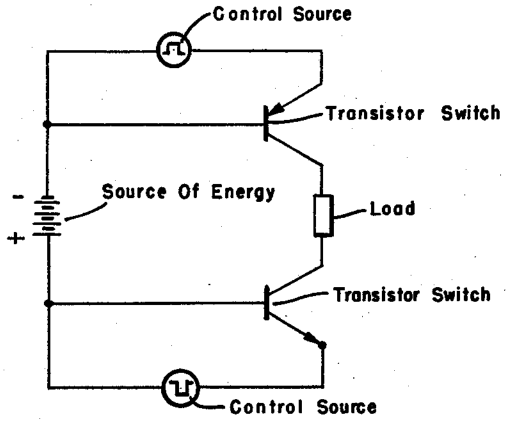
Figure 3:
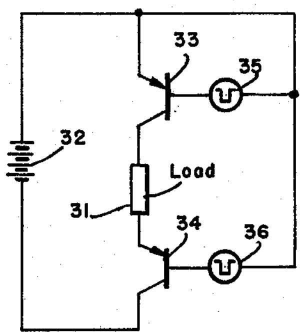
FIGURE 3 is a modified form of the invention, in accordance with the circuit of FIGURE 1A, utilizing non-complementary transistors.

In operation, it is necessary that the potential on the base of each transistor 33 and 34 be switched negative with respect to its emitter when the transistor is to assume a low impedance state; and when non-complementary transistors are employed, as is shown in FIGURE 3, it is further necessary that the base of transistor 34 be more positive than the anode of energization source 32 when the transistor is in the "off" state, and more negative than the cathode of source 32 when the transistor is in the "on" state. Signal sources 35 and 36 may be coupled respectively to transistors 33 and 34 to effect the desired switching control and, as may be seen from an examination of FIGURE 3, source 36 for instance, is shown as referred to the anode of energization source 32, although this is not really necessary. The essential consideration is that in order to control transistor 34 properly, the source 36 must swing through a voltage range approximately equal to the potential of source 32 in order to effect the aforedescribed relative potentials between the several electrodes of transistor 34 and the source of energization 32. The use of complementary transistors of the type shown in FIGURES 1 and 2, therefore, greatly reduces the swing required of a signal source such as 36; and in general increases the power gain which may be obtained from a transistor such as transistor 34, but as described in reference to FIGURE 3, the concepts of the present invention may also be employed where it is not convenient to utilize complementary transistors switching each end of a load.

Figure 4:
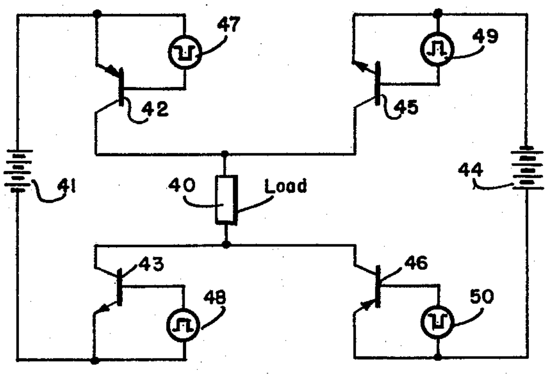
FIGURE 4 is a still further modification of the present invention capable of effecting bidirectional current flows through a load.

FIGURE 4 illustrates a further embodiment of the present invention whereby bidirectional current flows may be selectively effected through a load, and the device thus operates as a bipolar switch controlling both ends of a load. A load such as 40 may be selectively coupled to a source of energization 41, by transistors 42 and 43, and may also be selectively coupled to a source of energization 44 by transistors 45 and 46. Transistors 42 and 43 are selectively controlled by signal sources 47 and 48, while transistors 45 and 46 are selectively controlled by signal sources 49 and 50. The sources of energization 41 and 44 respectively are of opposing polarities, and similarly, the directions of normal conductivity of transistors 42 and 43 are opposite, with respect to load 40, to the directions of normal conductivity of transistors 45 and 46. Thus, upon the simultaneous application of signals from sources 47 and 48, each of transistors 42 and 43 will assume a low impedance state whereby current from source 41 will flow in a downward direction through load 40. In the alternative, however, simultaneous signals from sources 49 and 50 may switch transistors 45 and 46 to a low impedance state whereby source 44 will be effectively coupled to load 40 causing current to flow in an upward direction through load 40. Again, as described in reference to FIGURE 2, current limiters may be included in the circuit to improve the operating characteristics thereof.

Figure 5:
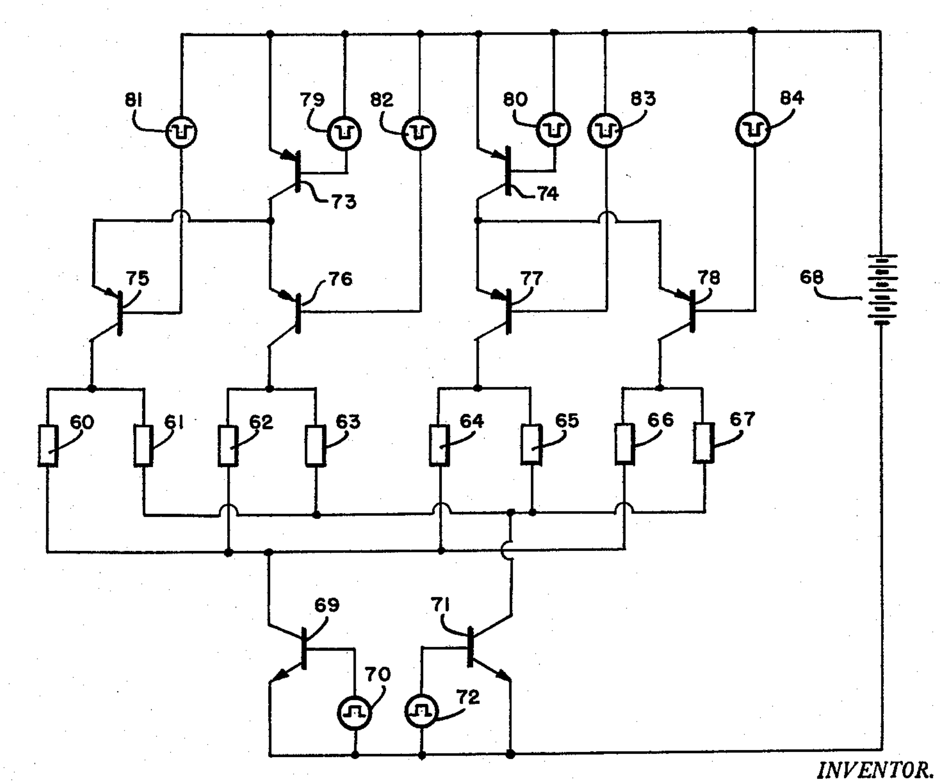
FIGURE 5 is another modification of the present invention utilizing plural loads in combination with switching means for preselecting a load or loads to be energized.

The concepts of the present invention may also be applied to the selective control of a plurality of loads, such as may be desired in binary operated switching networks. Thus, referring to FIGURE 5, a total of eight loads, such as 60 through 67 inclusive, may be selectively coupled to a source of energization 68 by a plurality of transistors and signal sources arranged as shown. One end of loads 60, 62, 64 and 66 may be coupled to the cathode of energization source 68 by a transistor 69 under the control of a signal source 70; and similarly, the corresponding end of loads 61, 63, 65 and 67 may be coupled to the cathode of energization source 68 by a further transistor 71 under the control of signal source 72. The upper ends of the several loads 60 through 67 may be selectively switched by the arrangement comprising transistors 73 through 78 inclusive, under the control of signal sources 79 through 84 inclusive. By appropriately selecting which of transistors 69 or 71, 73 or 74, and 75 through 78, are in a low impedance state, preselected ones of the loads 60 through 67 will be coupled to energization source 68. Thus, if transistors 73, 75 and 69 are caused to assume a low impedance state by their respective signal sources, current will flow through load 60 only. The selection of transistors 73, 75 and 71 causes current to flow through load 61. The selection of transistors 73, 76 and 69 causes current to flow through load 62, etc. A similar analysis may be applied for each of the loads 60 through 67, and it will be appreciated that through the use of the eight transistors shown, a unique combination of three transistors is provided for effecting current flow through each of the eight loads.

While separate signal sources such as 70, 72 and 79 through 84 have been shown, these eight signal sources may be replaced by a total of three flip-flops in order to provide the correct selection of signals according to binary digital rules. Thus, transistors 73 and 74 could be coupled respectively to opposite sides of a first flip-flop. Transistors 69 and 71 could be coupled to opposite sides of a second flip-flop. Transistors 75 and 77 could be connected to one side of a third flip-flop; while transistors 76 and 78 could have their control electrodes coupled to the opposite side of the said third flip-flop. When this particular configuration of three flip-flops is employed, it is possible to effect a unique relationship of flip-flop outputs for each load to be switched. Thus, the binary switching arrangement shown in FIGURE 5 may be controlled either by independent signal sources such as have been shown in the figure, or by a total of three flip-flop stages such as have been described. It will be appreciated that the arrangement of FIGURE 5, while described in reference to the switching of a total of eight loads, may be extended to the switching of any desired number of loads.

The concepts of the present invention may also be employed in switching applications, such as those utilized in coincident current memories; or for the switching of a series of magnetic heads such as may be present in magnetic recording applications. Thus, referring to FIGURE 6, a plurality of loads, such as 85, 86, 87, 88, etc., may represent loads to which it is desired to selectively switch either signals or powers, depending upon the particular application to be made of the circuit. The arrangement of FIGURE 6 may further be employed to effect such switching bidirectionally, in accordance with the concepts discussed in reference to FIGURE 4.

Thus, referring to load 85 for instance, the upper end of the said load may be coupled to a line 89, which is common to the upper ends of loads 87 and 88 as well. The lower end of load 85 may be coupled via a pair of diodes 90 and 91, poled as shown, to a pair of lines 92 and 93 respectively; and the lower ends of lines 92 and 93 may in turn be coupled via transistors 94 and 95 to the negative and positive terminals 96 and 97 of a pair of potential sources, under the control of signal sources 98 and 99 respectively. Line 89 is similarly coupled to the negative and positive terminals 100 and 101 of the said potential sources by a pair of transistors 102 and 103, under the control of signal sources 104 and 105 respectively.

It will be appreciated that the switching arrangement coupled to line 89, comprising elements 100 through 105 respectively, will be duplicated for each horizontal line of the switching matrix, and similar switching arrangements will be coupled, for instance to further horizontal lines 106 and 107. Similarly, the switching arrangements comprising transistors 94 and 95, which control vertical lines 92 and 93 respectively, will be duplicated for each of the several vertical lines employed, such as 108, 109, 110 and 111.

Figures 6, 7, 8:
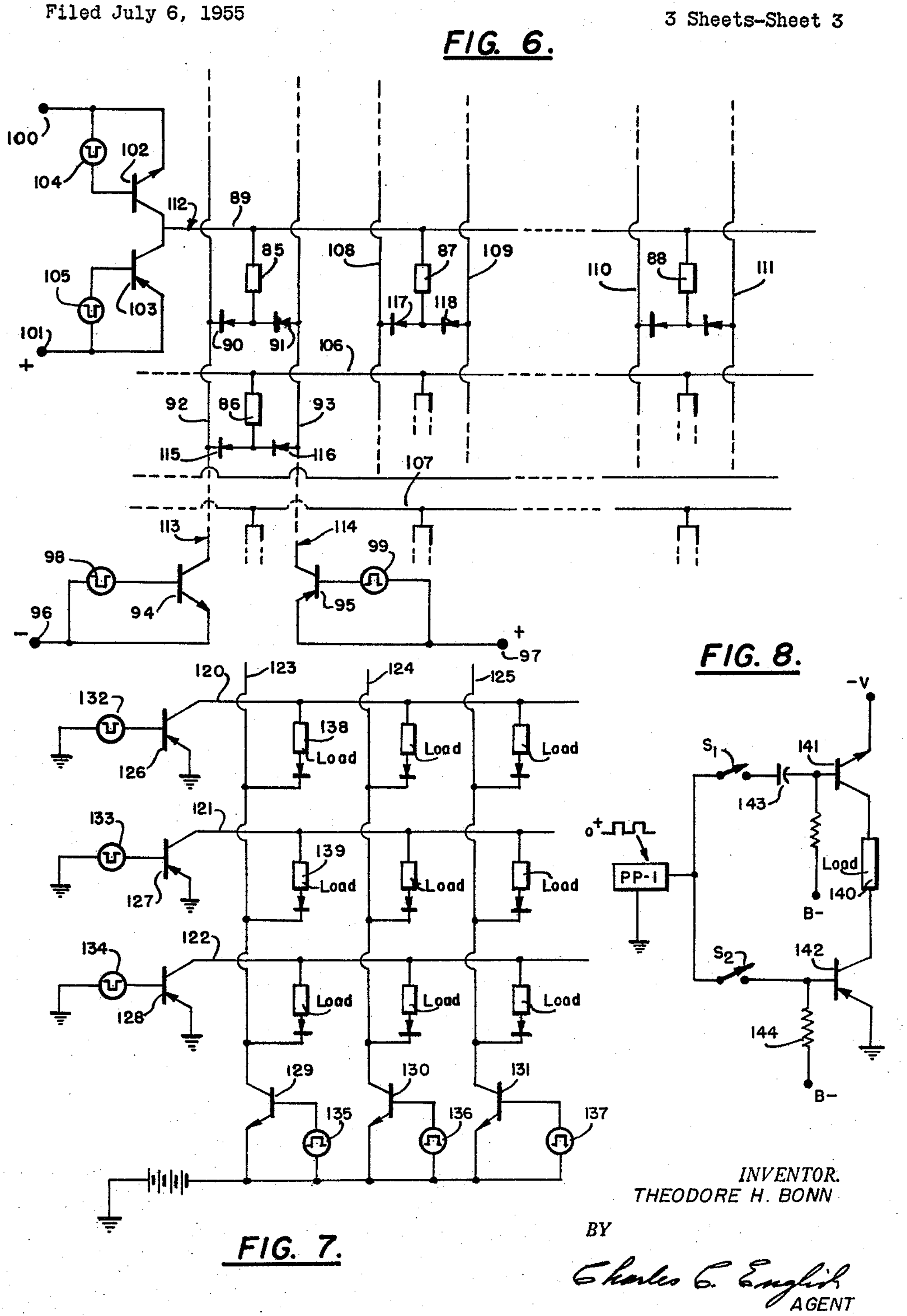
FIGURE 6 is a still further modification of the present invention concerned with bidirectional switching on rectangular coordinates.
FIGURE 7 is a modification of the circuit shown in FIGURE 6 adapted to effect unidirectional switching on rectangular coordinates.
FIGURE 8 illustrates another modification of the present invention.

Examining the operation of the coincident current switch shown in FIGURE 6, it will be appreciated that, upon simultaneous operation of signal sources 105 and 98, current will flow from terminal 101 through transistor 103 and thence through line 89, load 85, diode 90, line 92, and transistor 94, to negative terminal 96, whereby current flow is effected in a downward direction through load

85. Upon simultaneous operation of signal sources 99 and 104, an upward flow of current through load 85 will be effected, via transistor 95, diode 91, and transistor 102. Switching networks, such as those shown coupled to line 89, may thus be employed to selectively switch each of the horizontal lines of the matrix for current flow in either an upward or downward direction through the load coupled to that horizontal line; and by appropriate selection of the several switching arrangements coupled to the several vertical lines, current flow may be effected through selected ones of the several loads, in either selected one of two directions.

Again current limiting arrangements may be employed, and a bipolar current limiter may, for instance be interposed in line 89 at the point 112; or unidirectional current limiters may be interposed in the lines 92 and 93, for instance at the points 113 and 114. It should further be noted that the several diodes, such as 90 and 91, may be replaced by transistors, in accordance with the present invention, at the expense of using one transistor in place of each diode. When this form of the present invention is employed, no transistors such as 94, 95, etc., would be required along the bottom of the array. For instance, transistors 94 and 95 could replace directly the diodes 90 and 91. Other transistors could replace diodes 115 and 116. Still further transistors could replace diodes 117 and 118, etc. The control elements of all transistors tied, for instance, to line 92 could be coupled in parallel to a signal source for sending current in a downward direction through the several loads coupled to line 92, and similarly, the corresponding control elements of other transistors, such as those coupled to line 93, could be connected in parallel to a further signal source for sending current flows in an upward direction through the several loads. Although this arrangement of substituting transistors for the several diodes does require increased numbers of transistors to be utilized, the arrangement has an advantage in that the transistors employed would present a lower potential drop than would the diodes utilized in the arrangement of FIGURE 6.

The particular arrangement described in reference to FIGURE 6 is adapted, of course, to effect bidirectional switching on rectangular coordinates. In many applications, it may be necessary merely to provide for unidirectional switching in such rectangular cordinates, and in such an event, the circuit of FIGURE 6 may be modified in the manner illustrated in FIGURE 7.

Thus, referring to FIGURE 7, it will be seen that a coincident current switch, in accordance with the present invention, may comprise a plurality of horizontal lines 120, 121 and 122, and a plurality of vertical lines 123, 124 and 125. Each of the horizontal lines 120 through 122 is connected to a transistor such as 126, 127 and 128; and each of the vertical lines is coupled to a further transistor such as 129, 130 and 131. The state of conductivity of the several transistors 126 through 131 is selectively and individually controlled by sources 132 through 137 inclusive. A plurality of loads are connected, as shown, one end of each load being coupled to one of the said horizontal lines while the other end of each load is connected to one of the said vertical lines; and current may be selectively switched through any one of the plurality of loads by rendering the transistors coupled to the appropriate horizontal and vertical lines conductive. Thus, by selectively causing transistors 126 and 129 to be conductive, for instance, current will flow in a downward direction through load 138. If transistors 127 and 129 should be rendered conductive, current will flow in a downward direction through load 139. A simlar analogy applies to each of the other loads illustrated in FIGURE 7.

In each of the embodiments thus far described, a simultaneity of signals applied to transistors switching both ends of a load has ben required, to effect current flow through the load. By suitable modification, however, the present invention may be so practiced that, upon application of a signal coupled to a transistor switch at one end of a load, current will be passed through the said load, while the coupling of signals to transistors respectively connected at opposite ends of a load will inhibit current flow through the load.

Thus, referring to FIGURE 8, it will be seen that a load 140 may be selectively switched at one of its ends by a transistor 141 and the said load may further be switched at the other of its ends by another transistor 142. Control signals may be supplied from a source PP-1 producing regularly occurring positive-going pulses, and these control signals may be selectively coupled via a switch S1 to the base of transistor 141 and via a switch S2 to the base of transistor 142. Due to the several potentials coupled to the transistors, as illustrated, the NPN transistor 141 is normally non-conductive. PNP transistor 142 is in condition to conduct since its base is negative, but this transistor 142 is held in a non-conductive state at its collector by transistor 141.

If a positive signal should be applied from source PP-1 via switch S1 to the base of transistor 141, the said transistor 141 will be rendered conductive and a current will flow through transistor 142 and transistor 141 via the load 140. However, if each of switches S1 and S2 should be closed, a positive signal will be coupled to the base of transistor 142, as well as to transistor 141, thereby raising the potential of the base of the said transistor 142 and rendering transistor 142 non-conductive. Thus, the application of a signal to one only of the transistors 141 and 142 permits current to flow through the load 140, while the simultaneous application of signals to each of the transistors (by closure of each of the switches S1 and S2), will inhibit current flow through the load 140.

Since the base of transistor 141 is normally negative, it may be desirable to couple it to signal source PP-1 through an element adapted to block D.C. This coupling may, for instance, be effected by capacitor 143; but it will be appreciated that a transformer, for instance, could be employed in place of the said capacitor 143. It should further be noted that, inasmuch as base current of the transistor 142, through resistor 144, will cause the said base of transistor 142 to be very near ground potential, a D.C. blocking element between the source PP-1 and the transistor 142 may not be required.

While preferred embodiments of the present invention have been described, many modifications thereof will be suggested to those skilled in the art and certain of the modifications have been described in detail. It must, therefore, be stressed that the foregoing description is meant to be illustrative only and is not limitative of my invention, and all such modifications as are in accord with the principles discussed, are meant to fall within the scope of the appended claims.

Having thus described my invention, I claim:

1. A switching circuit comprising a load, a first transistor of a certain type having its collector coupled to one terminal of said load, a second transistor of a complementary type having its collector coupled to another terminal of said load, first control means coupled between the base and emitter of said first transistor for selectively applying signals thereto to control the conductivity of said first transistor, and second control means coupled between the base and emitter of said second transistor for selectively applying signals thereto to control the conductivity of said second transistor, means for applying energizing signals to one of said base and emitter electrodes of each of said transistors to pass current in a series circuit via said one electrodes and said collectors through said load in accordance with said control means signals, a third transistor of said complementary type having its collector coupled to said one load terminal, a fourth transistor of said certain type having its collector coupled to said another load terminal, means for applying control signals between the base and emitter of said third transistor and the base and emitter of said fourth transistor to control the conductivity thereof, and means for applying energizing signals to one of said base and emitter electrodes of each of said third and fourth transistors to pass current in a series circuit via said one electrodes and said collectors of said third and fourth transistors through said load in accordance with the associated control signals and in a direction opposite to that passed by said first and second transistors.

2. A switching circuit comprising a plurality of loads, switching means including a first transistor having one electrode coupled to a terminal of each of said loads, a plurality of second transistors each having one electrode coupled to another terminal of a different one of said loads, said first transistor being of a conductivity type complementary to said second transistors, means coupled to other electrodes of said transistors for energizing a plurality of series circuits each including said one and other electrodes of a different one of said second transistors the respective one of said loads and said one and other electrodes of said first transistor, and means for applying control signals to electrodes of said transistors to control the conductive states thereof between their respective one and other electrodes, said transistors being of such types and said one and other electrodes being such that current in the forward direction through said first transistor one and other electrodes is in the forward direction through said second transistor one and other electrodes.

3. A switching circuit comprising a plurality of loads operationally arranged in rows and columns, first and second pluralities of transistors respectively associated with said rows and columns, energizing means, means coupling first terminals of said loads in each of said rows to one terminal of said energizing means via the associated one of said first plurality of transistors, means coupling second terminals of said loads in each of said columns to another terminal of said energizing means via the associated one of said second plurality of transistors, and signal control means coupled to the transistors in said first and second pluralities of transistors for controlling the conductive states of said first transistors and second transistors to switch energizing currents through said loads with each of said loads when energized receiving current via those of said first and second pluralities of transistors that are coupled thereto, the type of said first plurality of transistors being complementary to that of said second plurality of transistors.

4. A switching circuit as recited in claim 3, and further comprising separate unidirectional impedance means connected between one of said terminals of each of said loads and one of said transistors connected thereto.

5. A switching circuit as recited in claim 3, wherein said loads are coupled to the collectors of said coupled transistors, and said signal control means are connected between the base and emitter electrodes of said transistors.

6. A switching circuit comprising a plurality of loads operationally arranged in rows and columns, first and second pluralities of transistors associated with said rows and third and fourth pluralities of transistors associated with said columns, energizing means, means coupling first terminals of said loads in each of said rows to said energizing means via a different one of said first plurality of transistors and via a different one of said second plurality of transistors, means coupling second terminals of said loads in each of said columns to said energizing means via a different one of said third plurality of transistors and via a different one of said fourth plurality of transistors, and signal control means coupled to said transistors for controlling the conductive states of said transistors to switch energizing currents through said loads with each of said loads when energized receiving current via one of those of said first and second plurality transistors and one of those of said third and fourth plurality transistors that are coupled thereto.

7. A switching circuit as recited in claim 6, and further comprising a separate unidirectional impedance connected between one of said terminals of each of said loads and one of said transistors connected thereto.

8. A switching circuit as recited in claim 6, wherein said first and third pluralities of transistors are of the same type and complementary to the type of said second and fourth pluralities of transistors.

9. A switching circuit as recited in claim 8, and further comprising a separate first unidirectional impedance connected between one of said terminals of each of said loads and the one of said third plurality of transistors connected thereto and a separate second unidirectional impedance connected between each of said one load terminals and the one of said fourth plurality of transistors connected thereto.

10. A switching circuit as recited in claim 6, wherein said loads are coupled to the collectors of said coupled transistors, and said signal control means are connected between the base and emitter electrodes of said transistors.

11. A switching circuit comprising a load, a first transistor having a first electrode coupled to a terminal of said load, a second transistor of a complementary type having a first electrode coupled to another terminal of said load, means for applying energizing signals to the second electrode of said first transistor and to the second electrode of said second transistor to supply current to a series circuit including said load and said second and first electrodes of said transistors in the forward directions therethrough, and means for supplying control signals to the third electrodes of said transistors to control the conductive states between said first and second electrodes, said control signal supplying means includes separate means for controlling the supplied signals and tending to render one of said transistors conductive and the other non-conductive.

12. A switching array comprising a plurality of loads, a first plurality of drive lines, each coupled respectively to one end of each of said loads, a second plurality of drive lines, each coupled respectively to the other end of each of said loads, first and second pluralities of transistors, said first plurality transistors being complementary to said second plurality transistors, each transistor of said first plurality having a third electrode coupled to one of said first plurality of drive lines, each transistor of said second plurality having a third electrode coupled to one of said second plurality of drive lines, and control means comprising first and second signal sources selectively coupling signals to first and second electrodes of a preselected one from said first plurality of transistors and to first and second electrodes of a preselected one from said second plurality of transistors, thereby to effect a drive output from the third electrodes of said preselected transistors.

13. In a switching circuit, at least one load, a first energy supplying means coupled to said load for effecting current flow therethrough in a first direction, a second energy supplying means coupled to said load for effecting current flow therethrough in a second direction opposite to said first direction, and control means interposed between said load and said first and second energy supplying means, said control means comprising a first pair of complementary transistors, one transistor of which is interposed between one terminal of the load and one pole of the first energy supply means, the other transistor of which is interposed between the other terminal of the load and the opposite pole of the first energy supplying means, a second pair of complementary transistors one transistors of which is interposed between one terminal of the load and one pole of the second energy supplying means, the other transistor of which is interposed between the other terminal of the load and the opposite pole of the second energy supplying means, each pair of transistors being arranged in conjunction with its respective energy supplying means to pass current in the respective forward direction of the transistors forming said pair and a plurality of input signal sources connected to said transistors whereby simultaneous application of input signals to one of said pairs of transistors is required in order to effect current flow through said load, the direction of said current flow being determined according to which of said pairs have simultaneous input signals applied thereto.

14. The switching circuit of claim 13 in which the transistors in each pair have their respective emitters connected to opposite poles of the associated energy supplying means, the signal sources being connected between the emitters and bases.

References Cited in the file of this patent

UNITED STATES PATENTS

| | | |
|---|---|---|
| 2,512,639 | Gohorel | June 27, 1950 |
| 2,557,644 | Forbes | Apr. 2, 1951 |
| 2,627,039 | MacWilliams | Jan. 27, 1953 |
| 2,666,818 | Shockley | Jan. 19, 1954 |
| 2,713,119 | Adler | July 12, 1955 |
| 2,722,649 | Immel et al. | Nov. 1, 1955 |
| 2,728,857 | Sziklai | Dec. 27, 1955 |
| 2,763,832 | Shockley | Sept. 18, 1956 |
| 2,791,644 | Sziklai | May 7, 1957 |
| 2,820,155 | Linvill | Jan. 14, 1958 |
| 2,825,889 | Henle | Mar. 4, 1958 |
| 2,831,126 | Linvill | Apr. 15, 1958 |
| 2,838,675 | Wanlass | June 10, 1958 |
| 2,887,619 | Hussey | May 19, 1959 |

OTHER REFERENCES

"Directly Coupled Transistor Circuits," by Beter, Bradley, Brown and Rubinoff, published by Philco Corp., reprinted from Electronics, June 1955, pp. 132–136.

"The Development of a High Speed Triode-Tree Electronic Commutator," by Paul Wolfe Cooper, submitted in partial fulfillment for the degree of Master of Service at M.I.T. (1951).

"The Development of an Electronic Commutator," by Hardy C. Martel, submitted in partial fulfillment of the requirement for the degree of Master of Science at M.I.T. (1950).

Lohman: "Complementary Symmetry," Electronics, September 1953.